United States Patent

[11] 3,622,294

| [72] | Inventors | David Gordon Loukes Prescot; Albert Sidney Robinson, Southport; Jack Lawrenson, St. Helens, all of England |
|---|---|---|
| [21] | Appl. No. | 831,074 |
| [22] | Filed | June 6, 1969 |
| [45] | Patented | Nov. 23, 1971 |
| [73] | Assignee | Pilkington Brothers Limited Liverpool, Lancashire, England |
| [32] | Priority | June 10, 1968 |
| [33] | | Great Britain |
| [31] | | 27,564/68 |

[54] METHOD AND APPARATUS FOR PRODUCING COATED FLAT GLASS
9 Claims, 11 Drawing Figs.

[52] U.S. Cl. .................................................. 65/30, 65/99 A, 65/182 R, 117/124 C, 204/180 R, 204/300
[51] Int. Cl. ..................................................... C03c 17/00, C03b 23/00
[50] Field of Search .......................................... 204/180 R, 300; 161/1; 117/124 C, 54; 65/30, 99, 182

[56] References Cited
UNITED STATES PATENTS

| 3,218,220 | 11/1965 | Weber | 161/1 |
| 3,467,508 | 9/1969 | Loukes et al. | 65/99 X |
| 2,198,733 | 4/1940 | Leibig et al. | 65/30 |
| 3,486,995 | 12/1969 | Evers | 65/30 |
| 3,060,057 | 10/1962 | Johnson | 117/54 |
| 3,418,233 | 12/1968 | Igras et al. | 204/300 |

Primary Examiner—Reuben Friedman
Assistant Examiner—Robert L. Lindsay, Jr.
Attorney—Morrison, Kennedy and Campbell ABSTRACT: A hollow glass article having predetermined characteristics, e.g. weathering, electrical conductivity, solar heat rejection, is produced by supporting the article, when hot, on a bath of molten metal, placing an electrically conductive material in the article, and passing a regulated electric current through the glass to impart electrolytically the desired surface characteristic to the glass.

PATENTED NOV 23 1971

DAVID GORDON LOUKES,
ALBERT SIDNEY ROBINSON &
JACK LAWRENSON

Inventors

By Morrison, Kennedy & Campbell
Attorneys

DAVID GORDON LOUKES,
ALBERT SIDNEY ROBINSON
& JACK LAWRENSON

*Inventors*

By *Morrison, Kennedy & Campbell*
*Attorneys*

METHOD AND APPARATUS FOR PRODUCING COATED FLAT GLASS

BACKGROUND OF THE INVENTION

This invention relates to the production of hollow glass articles having predetermined surface characteristics other than the natural characteristics inherent in the method of forming the article.

It is a main object of the present invention to provide an improved method of imparting to hollow glass articles, for example hollow glass half blocks, television tube face plates and electrical insulators, predetermined surface characteristics, for example in order to give a desired color to the article, to improve the weathering characteristics of the article surface, to impart a desired electrical conductivity to the surface of the article, or to increase the solar heat rejection characteristic of the article.

SUMMARY

According to the invention a method of producing a hollow glass article having predetermined surface characteristics other than the natural characteristics inherent in the method of forming the article, is characterized by thermally conditioning the article so that it is sufficiently hot to be electrically conductive, contacting the hot article with molten electrically conductive material, placing an electrically conductive material in the hollow in the article to form a layer of molten material therein, passing a regulated electric current through the glass between the layer and the bath to impart a desired surface characteristic to the article, separating the treated article from the bath, and removing the layer from inside the article.

The method of the present invention may be performed on a hollow glass article immediately after it is molded, the article being still sufficiently hot to be electrically conductive. For example hollow glass blocks which are formed by a continuous molding process are rapidly transferred from the molding machine to a bath of molten electrically conductive material on which the blocks are floated for treatment according to the invention. If the articles are not hot enough, or if their thermal conduction is not uniform throughout the thickness of the article it is desirable to produce thermal uniformity through the glass prior to the electrical treatment by allowing a residence period on the hot bath prior to the electrical treatment.

The bath of molten electrically conductive material may be a bath of molten metal on which the hot article is floated and over which a protective atmosphere is maintained. The presence of the protective atmosphere prevents oxidation of the molten metal of the bath.

The protective atmosphere may include a reducing constituent, for example 5 percent hydrogen, the presence of which in the atmosphere to which the treated article is subjected when it is separated from the bath assists in developing a desired characteristic, e.g. colloidal color, in the article following the migration of metal ions into the surface of the article.

Molten metals and metal alloys are preferred for the glass treatment method of the invention, and in some instances instead of employing a molten metal or a molten alloy, a molten salt body may be used either for the bath of molten electrically conductive material on which the hot article is supported or as the molten layer within the hollow article.

The invention also comprehends apparatus for use in producing a hollow glass article having a desired surface characteristic, comprising a conveyor for transferring a hot glass article to a treatment chamber containing a bath of molten metal, guide means for lowering the article onto the bath surface, means for advancing the article in a predetermined path along the bath and through an outlet therefrom a feed duct associated with said guide means for placing an electrically conductive material in the hollow article, a first electrical connector contacting the bath, a second electrical connector mounted so as to be dipped into and retracted from the molten layer in the advancing article, an electrical supply circuit connected to said connectors, means for removing the molten layer from the hollow article, and means for conveying the treated articles from the outlet from the chamber.

DESCRIPTION OF THE PREFERRED EMBODIMENT

Figure 1:
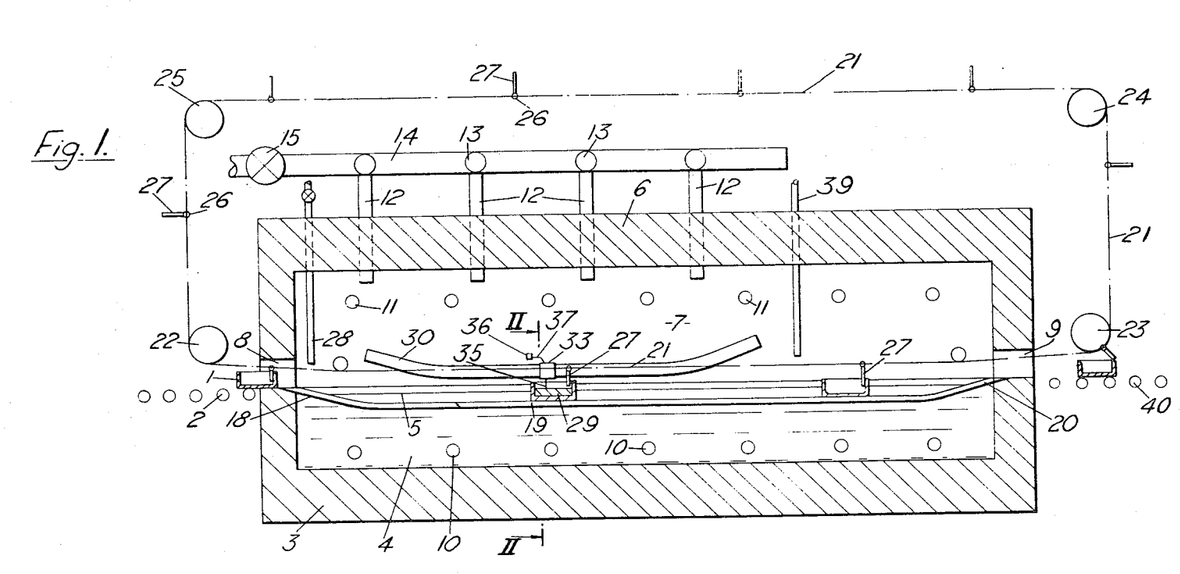
FIG. 1 is a sectional elevation of apparatus according to the invention for the continuous treatment of hollow glass half-blocks as they are delivered from a molding machine.

Hollow glass half-blocks are of generally rectangular form and in building construction are employed cemented or welded edge to edge to form a complete glass block. The half-blocks 1 are molded continuously from soda-lime-silica glass for example by a molding machine and the molded half-blocks 1 are discharged from the machine on to a conveyor 2 with their exterior faces lying on the conveyor. The conveyor 2 transports the molded half-blocks 1 while they are still hot, their temperature being in the region of 600° C. to 700° C. At such temperatures the blocks are sufficiently stiffened to retain their form. The temperature of the blocks may be equalized as they are advanced along the conveyor by means of heaters associated with the conveyor 2.

The conveyor 2 leads to the inlet end of a treatment chamber 3 of elongated form which contains a molten bath 4 of copper/bismuth alloy. The surface level of the molten metal is indicated at 5. A roof structure 6 closes the top of the chamber and defines a headspace 7 above the bath of molten metal in the chamber.

Above the surface level 5 of the molten metal at the inlet end of the chamber an inlet 8 is shaped so that it is just high enough to permit the passage of the glass blocks 1 through that inlet into the chamber. At the opposite end of the chamber there is an outlet 9 through which the treated blocks are subsequently discharged.

Heaters 10 which are indicated diagrammatically in FIG. 1, are immersed in the molten metal bath and radiant heaters 11 are mounted in the headspace over the bath so as to maintain a desired treatment temperature in the chamber, which temperature is not so high as to cause undue softening and loss of dimensional accuracy of the glass articles but is sufficiently high to ensure that the glass is sufficiently conductive to permit the electrically controlled migration of metal into the article surface to be treated.

Gas supply ducts 12 are connected by cross headers 13 to a main duct 14 which is connected to a protective gas supply means through a regulating valve 15. Through these ducts a protective atmosphere, for example a nitrogen-hydrogen atmosphere containing about 5 percent of hydrogen, is fed, in order to maintain a plenum of protective atmosphere in the headspace 7. This atmosphere prevents oxidation of the molten metal of the bath and of molten material placed within the hollow article.

Guide means are provided in the chamber 3 for controlling the gradual lowering of the glass block 1 into the bath 4 of molten alloy. In the embodiment illustrated for the treatment of hollow glass blocks two carbon guide rails 16 and 17 are fitted in the chamber 3. The guide rails form a downwardly sloping ramp 18 extending from the floor of the inlet 8 and curving into a horizontal central portion 19 whose depth beneath the surface level 5 of the molten bath determines the depth of immersion of the exterior surface of the hollow glass block in the molten metal. In this embodiment the maximum depth of the central parts 19 of the guide rails is the depth of the lower surface 1a of the block beneath the surface level 5 of the bath when the block is just floating in the molten metal, and the side edges of the exterior face 1a of the block just rest on the guide rails 16 and 17. From the end of their central parts 19 each of the guide rails 16 and 17 slopes upwardly, as shown at 20 gently to the level of the floor of the outlet 9 from the chamber.

Figure 2:
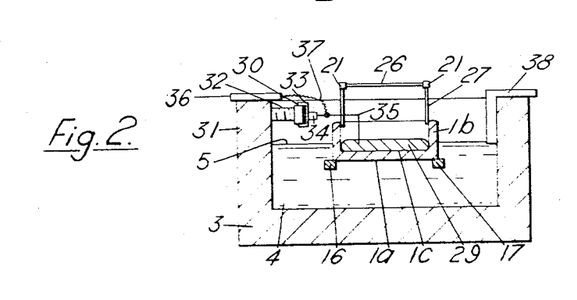
FIG. 2 is a section on line II—II of FIG. 1.

An endless double chain drive 21 extends through the headspace 7 in the chamber and engages around drive sprockets 22, 23, 24 and 25 mounted outside the chamber. The two lower sprockets 22 and 23 are respectively disposed near to the inlet 8 and the outlet 9 so that the lower reach of the chain drive passes just beneath the top of the inlet 8 and the outlet 9. The two chains of the drive 21 are, as illustrated in FIG. 2, connected at regular intervals by cross bars 26 to which are fixed fingers 27 of electrically insulating refractory material which extend downwardly from the lower reach of the chain as it passes through the chamber.

As each half-block 1 is conveyed towards the inlet 8 two of the fingers 27 engage within the hollow in the block near to the forward wall of the block so that the block is slid by these fingers from the conveyor 2 through the inlet 8, which may have a carbon floor and onto the downwardly sloping part 18 of the carbon guide bars 16 and 17. The gentle slope of this inlet ramp launches the advancing half-block gradually into the bath surface and the block is supported by the central horizontal parts 19 of the carbon guide rails on which the block rests as shown in FIG. 2 and is guided and traversed along the rails by the fingers 27.

During its initial advance into and along the bath surface each hollow glass block 1 is thermally conditioned to achieve a uniform temperature throughout the thickness of the glass. The block passes under the lower end of a feed duct 28 which extends downwardly through the roof structure 6 near to the inlet 8. A measured quantity of molten bismuth is fed into the container-like internal hollow in the block from the duct 28 and at the prefailing temperature a layer 29 of molten bismuth is held in the block.

The fingers 27 of the chain drive move the half-block 1 from beneath the supply duct 28 and there is a short initial period of travel along the bath during which time the interior layer 29 of molten bismuth achieves the temperature of the glass and the bath of molten metal.

A cam track 30 is fixed to a sidewall 31 of the chamber by insulating stanchions 32. A carriage 33 runs on the cam track and carries an inwardly facing insulating rod 34 to the end of which a right-angled electrode 35 is fixed. An electrical bus bar 36 extends through the sidewall 31 above the cam track 30 and a flexible lead 37 connects the electrode 35 to the bus bar 36.

The shape of the cam track 30 matches that of the guide rails 16 and 17 and a drive (not shown) for the carriage 33, which is synchronized with the chain drive 21 causes the carriage 33 to move along the cam track at the same speed of the block along the bath.

During the passage of the carriage 33 along the central horizontal part of the cam track, the electrode 35 dips into the layer of molten bismuth 29, and as the block 1 being treated approaches the end of the bath, the upward curve on that further end of the cam track 30 lifts the electrode 35 out of the hollow block.

The bus bar 36 is connected to the negative terminal of an electrical supply circuit, and the positive terminal of the supply is connected to an electrode 38 which is fixed into the opposite sidewall of the chamber and dips into the molten alloy bath 4. Thus the layer 39 of molten bismuth effectively acts as a cathode and the whole bath of molten copper-bismuth alloy effectively acts as an anode.

As soon as the electrode 35 dips into the interior molten layer 29 the current is automatically switched on by a process timer and, for example, a current of about 5 amps at a voltage of 10 volts is passed through the thickness of the hollow glass block from the bath 4 of molten copper-bismuth alloy to the layer 29 of pure bismuth. Current passes both through the bottom face 1a of the block and through the part of the side flanges 1b of the block which are immersed in the molten alloy bath.

The passage of the current is continued for about 10 seconds as the block is advanced along the bath, during which time there is migration of metal from the bath into the exterior surface of the block, which migration produces in the block an exterior surface stratum which is rich in metal ions.

After the predetermined time of electrical treatment the current is automatically switched off by the process timer, the interior electrode 35 is retracted from the block by the action of the cam track, and the fingers engaging the block advance the block further along the central part 19 of the guide rails towards the outlet 9. An extract duct 39 is lowered by a pneumatic ram into the block and suction is applied to withdraw the molten bismuth from the interior of the block. In a modified arrangement the interior electrode 35 dipping into the layer of molten bismuth may itself be hollow and suction may be applied to that electrode to remove the layer 29 from inside the block after the current has been switched off but before retraction of that electrode.

Thereafter the treated hollow glass block is separated from the bath of molten metal by being pushed up the outlet ramp constituted by the carbon guide bars 16 aNd 17 which rise gradually through and above the bath surface, so that the treated exterior surface 1a of the block is exposed to the protective atmosphere containing the reducing constituent and the metal ions in the surface skin of the glass are reduced to metallic form and the desired red/brown color is developed in the exterior surface of the block. The article is then conveyed through the outlet 9 from the tank structure onto a conveyor 40 which extends into an annealing lehr, not shown, in conventional manner.

When the interior surface 1c of the hollow glass brick article is being treated by the method of the invention by connection of the interior electrode 35 as the anode and connection of the bath of molten metal 4 as the cathode, the bath is, in this example, a bath of molten bismuth while a layer 29 of copper-bismuth alloy is maintained in the hollow in the article during the electrical treatment. Migration of metal ions takes place from this interior layer 29 into the interior surface 1c of the glass block and when the interior layer 29 is sucked out of the block, the treated glass immediately becomes exposed to the reducing atmosphere in the headspace 7 and the red/brown metallic color is developed in the interior glass surface 1c.

Another embodiment of apparatus according to the invention for the treatment of hollow glass half-blocks is illustrated in FIGS. 3 to 8. The bath of molten metal takes the form of a shallow channel 45 which is enclosed in a tank structure. The floor of the channel is made of graphite as indicated at 46 and the main part of the floor is a horizontal portion into which there leads a downwardly sloping ramp 47 at the inlet end, and an upwardly sloping ramp 48 leads from the downstream end of the horizontal part of the channel towards the outlet from the bath.

Figure 3:
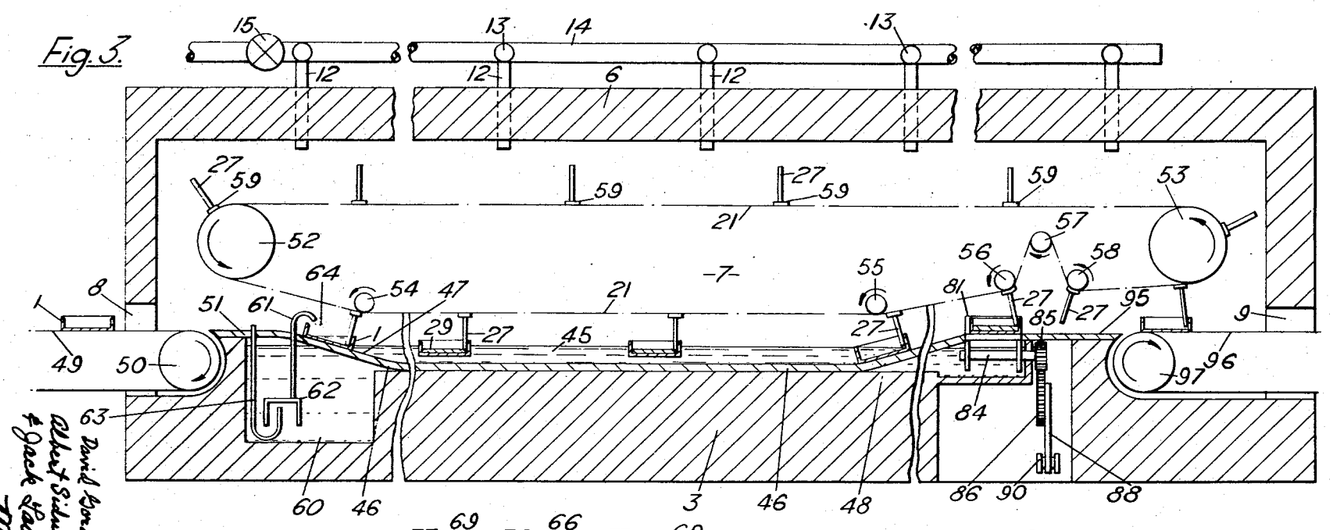
FIG. 3 is a sectional elevation similar to FIG. 1 of another embodiment of apparatus according to the invention, for the continuous treatment of hollow glass half-blocks.

Hollow glass half-blocks 1 are carried on a steel conveyor belt 49 from the molding process to the treatment chamber. The belt 49 passes into the chamber through a heightened inlet 8 and passes over a roller 50 which is mounted just within the structure defining the treatment chamber.

Extending from the end of the conveyor 49 there is a carbon-faced apron 51 onto which the molded half-blocks 1 are pushed from the conveyor, and when on the apron 51 each block is engaged by the fingers 27 on the chain drive 21 which is completely mounted within the headspace 7 defined over the shallow channel 45 of molten metal. The chain drive 21 passes around sprockets 52 near the inlet end of the chamber and sprockets 53 adjacent the outlet. Jockey sprockets 54 are mounted within the chamber so as to ensure that the slope of the chain drive passing from the sprockets 52 to the sprockets 54 is substantially parallel to the ramp 47 leading down into the bath. Then the chain drive 21 extends between the sprockets 54 and a further set of sprockets 55 mounted above the downstream end of the channel. The stretch of the drive between the sprockets 54 and 55 is horizontal. From the sprockets 55 the chain drive passes over a series of three sprockets 56, 57 and 58 before passing around the main drive sprockets 53. The function of the sprockets 56, 57 and 58 will be described below.

Figure 5:
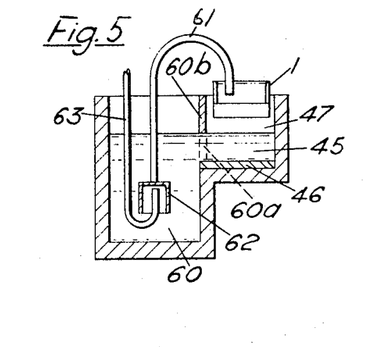
FIG. 5 is a section on line V—V of FIG. 4 showing the disposition of a pump for feeding molten metal into a half-block.
Figure 6:
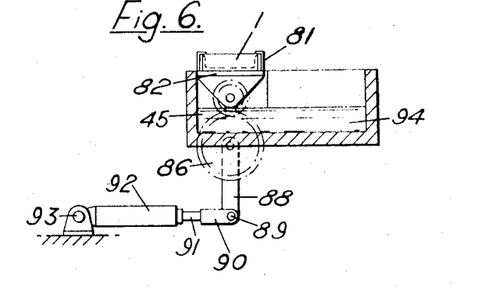
FIG. 6 is a section on line VI—VI of FIG. 4, illustrating a tipping arrangement for emptying molten metal from a treated half-block.
Figure 7:
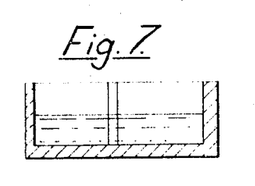
FIG. 7 is a section on line VII—VII of FIG. 4.

The fingers 27 are of a refractory metal for example ruthenium and are held in insulating mountings 59 which are illustrated in more detail in FIGS. 5 and 6. The insulating mountings 59 are fixed to cross bars 26 which connect the two chains of the drive 21.

As a pair of fingers 27 traverse around the main sprockets 52 they engage in a hot, hollow, glass half-block which is on the apron 51. The fingers 27 extend into the hollow in the half-block, engage the front face of tat hollow and push the half-block down the ramp 47 into the molten metal.

Beneath and to one side of the ramp 47 there is a reservoir 60 of the molten alloy, for example copper/bismuth alloy, a layer of which is to be placed in the hollow in the half-block. The reservoir 60 communicates with the channel 45 through an opening 60a defined beneath a partition wall 60b. A supply duct 61 extends upwardly at the side of the ramp 47 from a gas-lift pump 62 mounted in the reservoir 60 and which is supplied with inert gas, for example nitrogen, through a gas supply pipe 63. Molten alloy pumped upwardly through the duct 61, which is bent downwardly at its top so as to lie over the path of travel of the half blocks, is pumped and injected into each half-block in the manner indicated at 64. The angle of the half-block 1 as it is being pushed down the ramp 47 by the fingers 27 is such that the quantity of alloy contained within the half-block when it just begins to overflow is that measured quantity required for the layer in the block during the treatment of the half-block by the electrical method of the invention.

Excess alloy runs over the front edge of the half-block into the channel 45 which in this embodiment is constituted by the same metal or alloy as is contained in the reservoir 60. The simple metal used may be molten tin.

The depth of the channel 45 is such that the blocks are launched from the ramp 47 into the channel and float along the channel without touching the floor 46 of the channel, although the floor is faced with carbon so as to obviate any damage to the exterior face of each half-block in the event that it should touch the floor of the channel.

Figure 4:
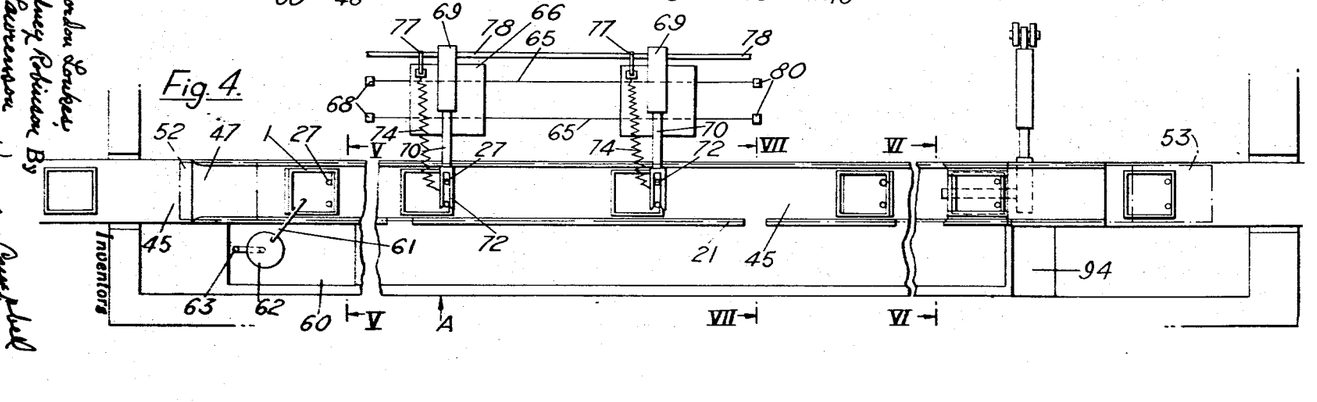
FIG. 4 is a plan view of the apparatus of FIG. 3, with the roof structure removed.
Figure 8:
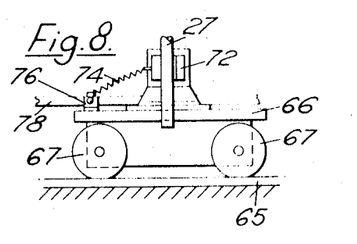
FIG. 8 is a side elevation, in the direction of arrow 4 in FIG. 4, of a trolley forming part of the apparatus of FIGS. 3 and 4.
Figure 9:
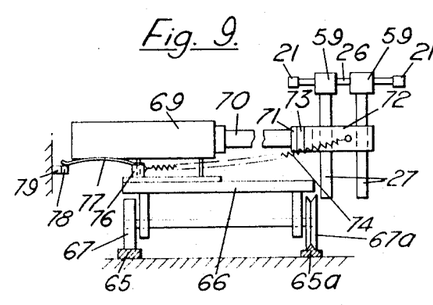
FIG. 9 is a side elevation of the trolley of FIG. 8.

Mounted within the tank structure alongside the channel 45 there is a track consisting of a flat-headed rail 65, and an inverted-V section rail 65a as shown in FIG. 9. A towed trolley 66 which is shown in FIG. 4 and in greater detail in FIGS. 8, 9 and 10 runs along the track. The trolley 66 has flat-rimmed wheels 67 which run on the flat rail 65 and grooved wheels 67a which run on the guiding track 65a and the trolley 66 is towed along the track by a drive mechanism which moves in synchronism with the chain drive 21.

Figure 10:
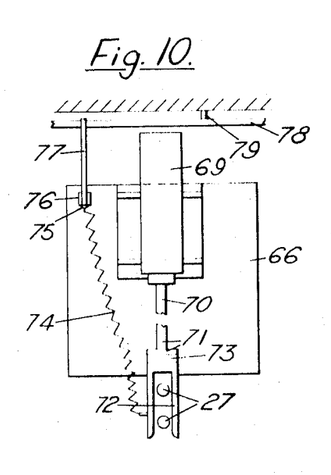
FIG. 10 is a plan view of the trolley of FIGS. 8 and 9.

At the upstream end of its traverse the trolley abuts against buffers 68 to determine an initial position of the trolley. Mounted on the trolley 66 there is a pneumatic cylinder 69 having a ram 70 whose end is flanged as indicated at 71. A fork member 72 is fixed to this flange through an intermediate slab 73 of insulating material.

The fork 72 is connected by an electric lead 74 to a terminal 75 which is fixed to an insulating block 76 mounted on the trolley 66. Extending outwardly from the terminal 75 there is a wiper strip contact 77 which wipes on a bus bar 78 which is fixed by insulating spaces 79 to a sidewall of the tank structure.

When the trolley 66 is against the buffers 68 and the pair of fingers 27 engaging in a block 1 are just opposite the fork 72, the pneumatic cylinder 69 is automatically supplied with air under pressure and the ram 70 is urged outwardly so that the fork 72 engages about the pair of fingers 27. The trolley is then driven forwardly as illustrated in FIG. 4 at the same speed as the chain drive 24 and electrical contact is made between the fingers 27 and the fork 7 2 and at the same time the wiper 7 7 is contacting the bus bar 78 and current is supplied from the wiper 77 by the lead 74 to the forks 72 and by the fingers 27 to the molten layer 29 in the hollow block, into which layer the fingers dip.

Electrical connection is also made to the molten metal in the channel 45 and the sense of the electrical connection can be such that the desired treatment of the exterior or interior surface of the block is achieved.

The treatment takes place as the block 1 and the trolley 66 are advancing together and by the time the trolley 66 reaches stops 80 at the downstream end of the track 65 the electrical treatment of the block is complete. The ram 70 is immediately retracted into the cylinder 69 so that the fork 72 disengages from the fingers 27. The further advance of the block along the channel 45 continues.

The fingers then move under the sprockets 55 and the ascent of the electrically treated block up the ramp 48 at the outlet end of the channel begins.

Figure 11:
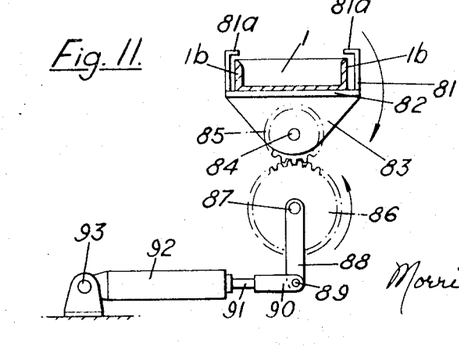
FIG. 11 is a detailed elevation of a device for tilting hollow glass half-blocks, which is part of the apparatus of FIGS. 3 and 4.

At the top of the ramp 48 the fingers 27 push the block into an open ended frame 81 into which the block easily slides. As shown in FIG. 11 the sides of the frame 81 have inturned top edges 81a beneath which the side flanges 1b of the treated block 1 fit.

The frame 81 is mounted on a table 82, FIG. 8, along which the block slides, and the table 82 is carried on support brackets 83 which are fixed to a horizontal spindle 84 on one end of which is mounted a toothed wheel 85. This wheel meshes with a toothed wheel 86 fixed to a spindle 87 to which there is fixed one end of a link 88 the other end of which is pivotally held as indicated at 89, in a fork 90 on the end of a ram 91 slidably mounted in a pneumatic cylinder 92. The opposite end of the cylinder is pivoted in a mounting 93.

When a half-block has been slid into the frame 81 beneath the inturned edges 82 the fingers which were engaged in that block are immediately lifted from the block by the passage of the chains 21 around the sprockets 56 and up to sprockets 57 mounted at a distance above the level of the table 82. The cylinder 92 is then actuated to extend the ram 91 so that the wheel 86 rotates and the table 82 is tilted. The ratio of the tilted wheels 85 and 86 is such that the extension of the ram 91 tilts the table through 180°. The half-block 1 in the frame 81 is thus held upside down over a sump 94 which communicates with the channel 45 into which the molten layer 29 in the block pours.

The ram 91 is immediately retracted into the cylinder 92 to return the table 82 to its upright position and the next block 1 to be pushed up the ramp 48 pushes the emptied half-block from the frame 81 onto an apron 95 which is also faced with carbon. The block sits on the apron 95 until it is engaged by the fingers 27 which have now passed downwardly from the sprockets 57 to the sprockets 58 which are on the same level as the guide sprockets 56 and the bottom of the main drive sprockets 53.

The fingers 27 then slide the treated block along the apron 95 and onto a conveyor belt 96 extending around a drive roller 97 mounted within the tank structure, which belt 96 carries the treated half-blocks through the outlet 9 from the tank structure to an annealing lehr or a welding station where the blocks are welded together to form complete hollow glass blocks.

As clearly shown in FIG. 3 the arrangement for emptying the molten material from the blocks as well as the apron 95 and the first part of the conveyor 96 are all within the headspace 7 in which the protective atmosphere with a reducing constituent, for example a nitrogen-hydrogen atmosphere, is maintained at a plenum. As soon as the treated surface of the glass is exposed to the atmosphere in the headspace reduction of metal ions which have entered the treated surface of the glass takes place to develop the desired metallic color in the glass surface. When copper bismuth alloy is employed a red/brown metallic color is developed.

The under surface of the block, that is the surface which becomes the exterior surface of the block, is fully exposed to the atmosphere in the headspace during the time when the block is tilted upside down in the frame 81.

By the time the block has passed through the outlet 9 the color in the surface is fully developed.

When it is desired to treat both surfaces 1a and 1c of the glass block simultaneously alternating current may be employed and as well as effecting the simultaneous treatment it also has a heating effect on the glass as the current alternates through the thickness of the glass.

A high-frequency alternating component may be injected into the direct current supply to maintain the thermal condition of the glass.

Treatment with salts may also be carried out, for example a layer of molten cuprous chloride may be formed in the interior of the article by pouring the salt in powdered form through the duct 28 into the hollow and allowing a residence period on the bath sufficient to melt the salt to form the desired molten layer before electrical connection is made. The bath may be of a molten salt if desired.

The bath of molten metal may be a bath of molten tin or of a tin alloy and the treatment of the glass block surface may be effected by inducing migration of tin into either or both surfaces of the block.

The bath or the interior layer may be an alloy of tin with a metal selected from the group consisting of lithium, sodium, potassium, zinc, magnesium aluminum, silicon, titanium, manganese, chromium and ion. In other applications the alloy may be a lead-copper alloy or an alloy of bismuth or lead with a metal selected from the group consisting of lithium, sodium, potassium, zinc, magnesium, aluminum, silicon, titanium, manganese, chromium, iron, cobalt, nickel, silver, gold, antimony, arsenic and indium.

Particular characteristics of reflectivity, color or electrical conductivity may be imparted to the glass. For example introduction of lead into the glass surface improves the solar heat rejection characteristics of the surface skin of the glass.

When the molten material employed as the interior layer is different from the molten metal of the bath, the reservoir 60 and sump 94 of the embodiment of FIGS. 3 to 11 are completely separate from the channel 45, and molten material is returned from the sump 94 to the reservoir 60.

The electrical conductivity of the outer surface of a molded hollow glass insulator may be modified by floating the insulator head downwards in the molten metal bath and filling the interior of the hollow head and skirt of the insulator with a second molten electrically conductive material prior to the passage of electric current to cause modification of the outer surface of the insulator.

Other articles which can be treated by this method are curved sheets of glass which are sufficiently dished to constitute a container for the interior layer of molten electrically conductive material, for example television tube face places and imposion guards for television tubes.

Introduction of lithium or potassium into both surfaces of the hollow articles enables the article to be subsequently strengthened by ion exchange reactions involving the lithium or potassium ions.

If it is necessary to carry out the electrical treatment of the articles at a temperature such that some distortion or loss of precision in dimension results then after the electrical treatment according to the invention a molding stage may follow in which the accurate dimensions of the article are restored.

The invention thus provides an improved method whereby the surface characteristics of either the interior surface, exterior surface, or both surfaces of a hollow glass article are modified in order to impart desired characteristics to that article while maintaining the form of the article and of its surfaces produced by the forming process for the production of the hollow glass article.

We claim:

1. Apparatus for use in producing a hollow glass article having a desired characteristic, comprising a conveyor for transferring a hot glass article to a treatment chamber containing a bath of molten metal, guide means for lowering the article onto the bath surface, means for advancing the article in a predetermined path along with the bath and through an outlet therefrom, a feed duct associated with said guide means for placing an electrically conductive material in the hollow article, a first electrical connector contacting the bath, a second electrical connector mounted so as to make electrical contact with the molten layer in the advancing article, means for moving said second connector with an article, an electrical supply circuit connected to said connectors, means for removing the molten layer from the hollow article, and means for conveying the treated articles from the outlet from the chamber.

2. Apparatus according to claim 1, wherein said article advancing means comprises guide rails in the bath of molten metal arranged to determine the path of an article through the bath, the rails being fixed at a depth below the bath surface which determines the depth of immersion of the articles in the bath.

3. Apparatus according to claim 2, wherein said article advancing means further comprises a chain drive mounted to extend through the treatment chamber just above the bath surface, and fingers fixed at regular intervals on the drive to engage in an article on the conveyor and advance that article through the chamber to the conveyor at the outlet from the chamber.

4. Apparatus according to claim 3, wherein said means for moving said second connector with an article comprises a carriage running on a cam track fixed in the chamber above the bath surface, the second connector consists of an electrode rod mounted on the carriage, and said apparatus further comprises means for driving the carriage along the cam track in synchronism with the chain drive, the cam track being shaped so that the electrode rod dips into and advances with a hollow article being advanced by said fingers along the bath.

5. Apparatus according to claim 1, wherein said removing means comprises an open-ended frame for receiving and holding each article as it is advanced away from the bath, and a tilting mechanism on which said frame is mounted, to tilt the article and pour the molten layer from the hollow in the article.

6. A method of producing a hollow glass article having predetermined characteristics other than the natural characteristics inherent in the method of forming the article, comprising thermally conditioning the article at a temperature in the range of about 600° C to 700° C so that it is sufficiently hot to be electrically conductive, supporting the hot hollow article with its hollow uppermost, on a bath of molten metal over which a protective atmosphere including a reducing agent is maintained, placing a measured quantity of molten metal in the hollow in the article to form a layer therein, making electrical connection with said layer and said bath, passing a regulated electric current through the glass between the layer and the bath to impart a desired metallic migration into the article, and separating the treated article from the bath while the article is still within said protective atmosphere.

7. A method according to claim 6, wherein said electric current is passed through the glass from the bath to the layer to enforce ionic migration of modifying metal into the exterior surface of the article.

8. A method according to claim 6, wherein said electric current is passed from the layer to the bath to enforce ionic migration of modifying metal into the interior surface of the hollow article, and said layer is then removed from the hollow article while the article is still within the protective atmosphere.

9. Apparatus according to claim 1, wherein said article advancing means comprises a chain drive mounted to extend through the treatment chamber just above the bath surface, fingers of electrically conductive material fixed in insulating mountings at regular intervals on the chain drive, a guide track alongside the path of travel of the articles along the bath, a trolley running on the guide track, a movable member mounted by a retractable mounting on the trolley, and means for extending said movable member into contact with said fingers, and wherein an electrical connection is connected to said movable member to make electrical connections with the fingers when the movable member is extended thereby making and maintaining electrical connection with the inside of the hollow article until retraction of the said movable member at the end of a run of the trolley.

* * * * *

UNITED STATES PATENT OFFICE
CERTIFICATE OF CORRECTION

Patent No. 3,622,294        Dated November 23, 1971

Inventor(s) D. G. Loukes et al

It is certified that error appears in the above-identified patent and that said Letters Patent are hereby corrected as shown below:

IN THE TITLE

Change the title of the invention to read as follows:

--METHOD AND APPARATUS FOR PRODUCING HOLLOW GLASS ARTICLES HAVING MODIFIED SURFACE CHARACTERISTICS--

Signed and sealed this 1st day of August 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,622,294       Dated November 23, 1971

Inventor(s) D.G. Loukes et al

It is certified that error appears in the above-identified patent and that said Letters Patent are hereby corrected as shown below:

Column 8, line 16 delete "with".

Signed and sealed this 6th day of February 1973.

(SEAL)
Attest:

EDWARD M. FLETCHER, JR.
Attesting Officer

ROBERT GOTTSCHALK
Commissioner of Patents